Nov. 15, 1960 D. T. COLLINS 2,960,169
HARROW HITCH
Filed Sept. 16, 1958 2 Sheets-Sheet 1

Dalton T. Collins
INVENTOR.

Nov. 15, 1960 D. T. COLLINS 2,960,169
HARROW HITCH
Filed Sept. 16, 1958 2 Sheets-Sheet 2
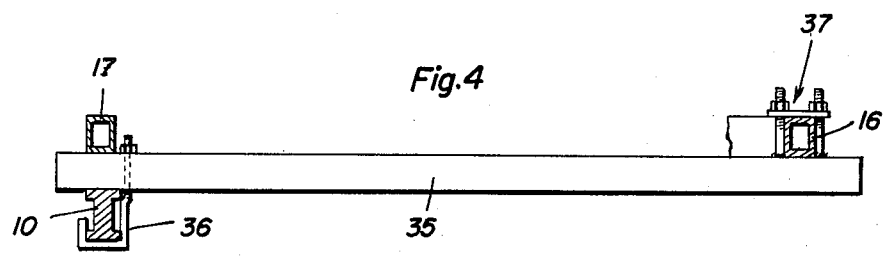
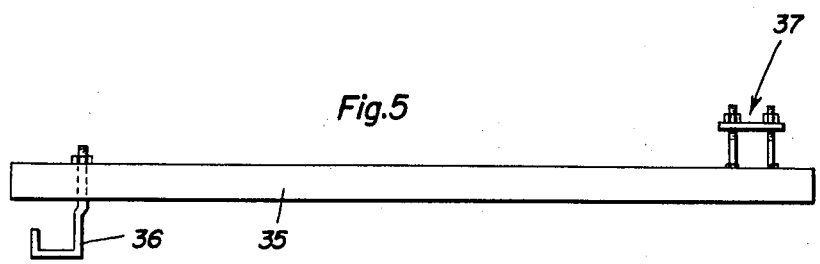
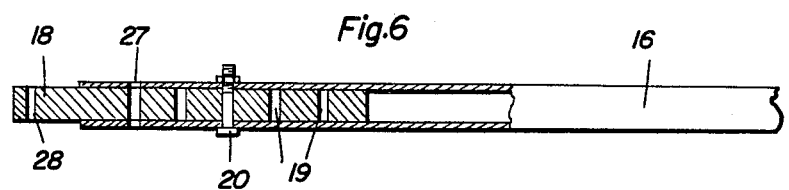
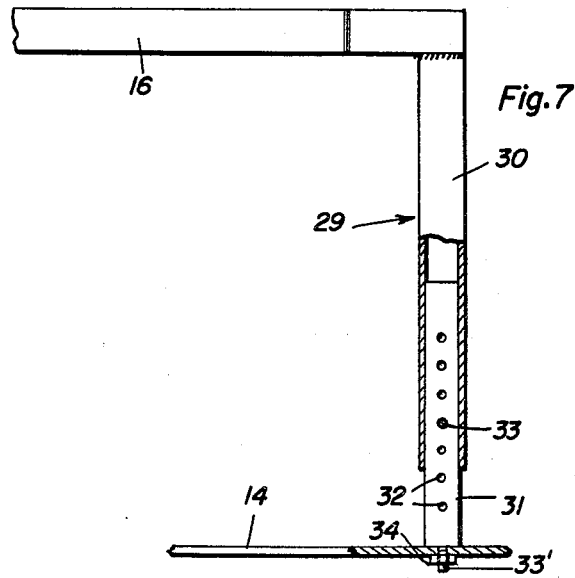
Dalton T. Collins
INVENTOR.
BY *Clarence A. O'Brien*
*and Harvey B. Jacobson*
Attorneys

United States Patent Office 2,960,169
Patented Nov. 15, 1960

2,960,169

HARROW HITCH

Dalton T. Collins, Green Mountain, Iowa

Filed Sept. 16, 1958, Ser. No. 761,439

2 Claims. (Cl. 172—198)

This invention relates to new and useful improvements in harrow hitches and has for its primary object to provide novel means for attaching a harrow to a mounted or wheeled gang plow in a manner to be raised and lowered therewith, thus permitting the implement to be transported, ditches crossed, corners turned, etc., without detaching said implement.

Another very important object of the present invention is to provide, in a manner as hereinafter set forth, a hitch of the aforementioned character which will allow the harrow to be vertically adjusted to meet various conditions which may be encountered.

Still another important object of the invention is to provide a harrow hitch of the character described which may be readily mounted on conventional two, three or four bottom mounted or wheeled plows without altering or modifying said plows structurally.

Another object of the invention is to provide, in a hitch of the character set forth comprising a pair of laterally angulated draft bars pivotally connected at one end to the plow for vertical swinging movement, novel means for adjustably connecting the other or free end portions of said draft bars to the harrow.

Other objects of the invention are to provide a harrow hitch of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a view in transverse section through an intermediate portion of the device, showing the means for stabilizing the assembly, taken substantially on the line 4—4 of Figure 2;

Figure 5 is a detail view in side elevation of the stabilizing bar or brace;

Figure 6 is a view principally in horizontal sectional through the forward end portion of one of the draft bars; and Figure 7 is a view in side elevation, partially in section, showing the means for adjustably securing the harrow to the rear end portions of the draft bars.

Figure 1:
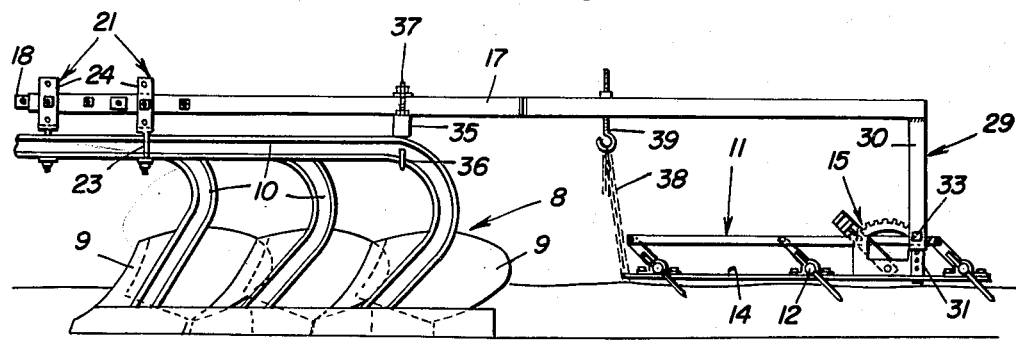
Figure 1 is a view in side elevation, showing a harrow hitch embodying the present invention installed.
Figure 2:
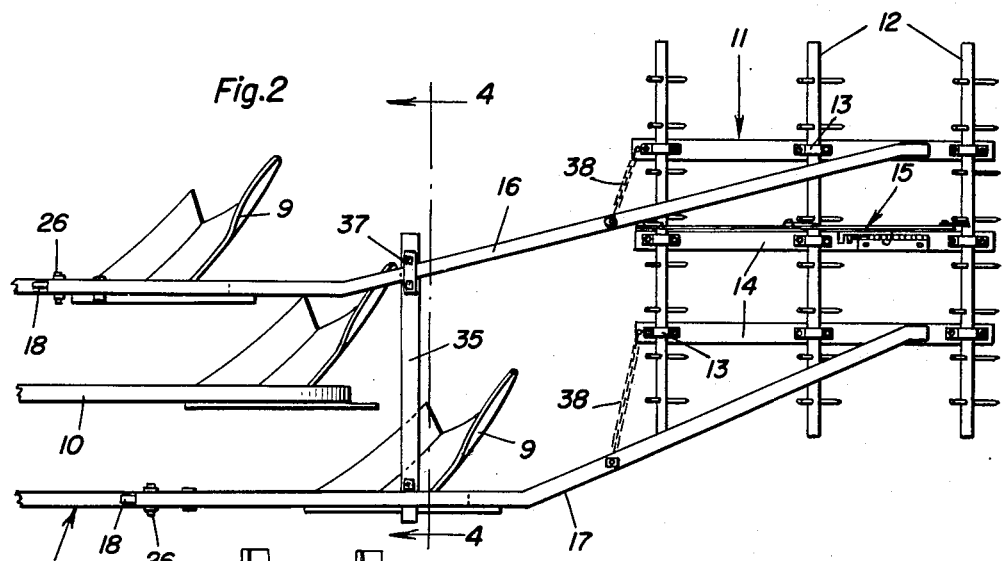
Figure 2 is a top plan view thereof.
Figure 3:
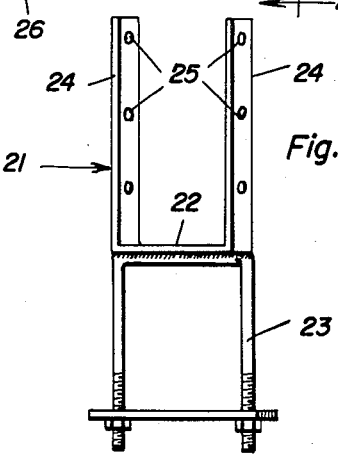
Figure 3 is a detail view in elevation, showing the means for pivotally and adjustably connecting the draft bars to the plow beams.

Referring now to the drawing in detail, it will be seen that reference character 8 designates generally a portion of a three bottom plow. The implement comprises the usual plows or shares 9 on the rear end portions of beams 10.

Reference character 11 designates generally a harrow to be attached to the plow 8. The harrow 11 comprises a plurality of rockably adjustable tooth bars 12 journalled in bearings 13 provided therefor on longitudinal bars 14. The harrow 11 further comprises suitable means 15 for adjusting the tooth bars 12.

The embodiment of the present invention which has been illustrated comprises a pair of laterally angulated draft bars 16 and 17 of suitable metal, said bars being tubular and substantially square in cross-section. Telescopically mounted for longitudinal adjustment in the forward end portions of the bars 16 and 17 are extensions 18 (see Figure 6). The extensions 18 are provided with spaced transverse openings 19 in which a bolt 20 is selectively engageable for securing said extensions in adjusted position. The bars 16 and 17 are pivotally mounted for vertical swinging movement on the outermost beams 10 of the plow 8 through the medium of substantially U-shaped brackets 21. Welded to the bight portions 22 of the brackets 21 and depending therefrom are U-bolts 23 for securing said brackets in an upright position on the plow beams 10. The upstanding legs 24 of the brackets 21 are provided with spaced openings 25. The bars 16 and 17 are pivotally connected to the brackets 21 through the medium of pivot bolts 26 which are engageable selectively in the openings 25. In addition to the openings which accommodate the bolts 20, the bars 16 and 17 are provided with openings 27 with which the openings 19 are selectively registerable for accommodating the pivot bolts 26. The extensions 18 are provided, in the outer end portions thereof, with openings 28 for receiving the pivot bolts 26 when said extensions are in use.

Fixed on the rear end portions of the bars 16 and 17 and depending therefrom are telescopically adjustable arms or hangers 29. The hangers 29 include tubular stationary upper female sections 30 which are affixed to the bars 16 and 17. The hangers 29 further include adjustable male sections 31 which are slidably engaged in the sections 30. The male sections 31 of the hangers 29 are provided with spaced openings 32 (see Figure 7) in which bolts 33 in the female sections 30 are selectively engageable for securing the vertical adjustment. Depending from the male sections 31 of the hangers 29 are bolts or shanks 33' which pass through openings provided therefor in the rear end portions of the outer longitudinal bars 14 of the harrow 11 for securing said hangers to said harrow in a manner to permit rotary adjustment of said hangers and lateral swinging movement of the bars 16 and 17. Retaining nuts 34 are threaded on the shanks 33'.

A transverse brace 35 has one end portion secured by a J-bolt 36 on the rear portion of the long, left hand beam 10 of the plow 8. The other end portion of the brace 35 is secured beneath the bar 16 at an intermediate point through the medium of a clamp 37. The brace 35 maintains the bars 16 and 17 at the desired angle in addition to keeping the harrow 11 in proper alignment. The bar 17 rests on the brace 35. The brace 35 is clamped to the respective plow beam 10 in a manner to permit sufficient vertical swinging movement of the bar 16.

Chains 38 are provided for levelling the harrow 11. Toward this end, the chains 38 have one end connected to the front of the harrow 11. The other end portions of the chains 38 are adjustably engageable in hooks 39 on the bars 16 and 17.

It is thought that the operation of the device will be readily apparent from a consideration of the foregoing. Briefly, the bars 16 and 17 are pivotally connected for vertical swinging movement to the plow beams 10 and the forward end portions of said bars overlie said beams in parallelism therewith. As the plow is drawn forwardly by the tractor, the harrow 11 is dragged after the plow by the bars 16 and 17 in an obvious manner. The vertically swingable bars 16 and 17 permit the harrow 11 to readily follow the contours of the ground. Through the medium of the telescopic hangers 29 the harrow 11 may be readily adjusted vertically relative to the bars 16 and 17. The chains 38 are then adjusted at 39 to keep the harrow level. The rotatably adjustable connections at 33' of the hangers 29 to the harrow 11 permit the bars 16 and 17 to be swung toward or away from each other to be connected to plows of various widths. When the beams 10 are raised to withdraw the shares 9 from the soil the bars 16 and 17 are swung upwardly in unison therewith for elevating the harrow 11. The implement may now be conveniently transported, ditches and streams crossed, corners negotiated, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hitch for connecting a harrow to laterally spaced parallel beams having plows thereon and vertically swingable in unison to raise and lower the same, said hitch comprising a pair of draft bars having front end portions laterally spaced and parallel to overlie said beams parallel therewith, terminal pivot means on said front end portions attachable to said beams forwardly of said plows on the beams for raising and lowering of said draft bars relative to said beams, a transverse brace member in the rear of said pivot means rigidly attached at one end to one draft bar and underlying the other draft bar with means thereon for attaching its other end to one of said beams in overlying relation thereto, whereby raising of said beams will raise said draft bars correspondingly, said draft bars having laterally angulated rear portions for offsetting a harrow laterally of said plows on said beams, and terminal hanger arms rigidly depending from said rear end portions and pivotally attachable to opposite sides of a harrow.

2. A hitch according to claim 1, said terminal hanger arms having bottom vertical pivot members thereon for pivotal attachment to opposite sides of a harrow.

References Cited in the file of this patent
UNITED STATES PATENTS

| | | |
|---|---|---|
| 1,580,145 | Leyner | Apr. 13, 1926 |
| 2,274,767 | Zink et al. | Mar. 3, 1942 |
| 2,318,981 | Wiley | May 11, 1943 |
| 2,499,988 | Cox | Mar. 7, 1950 |
| 2,673,434 | Babinchak | Mar. 30, 1954 |